United States Patent [19]
Carrie

[11] Patent Number: 5,201,030
[45] Date of Patent: Apr. 6, 1993

[54] METHOD AND APPARATUS FOR DITHERING GRAPHIC IMAGES

[75] Inventor: Susan Carrie, Mountain View, Calif.

[73] Assignee: Sun Microsystems, Inc., Mountain View, Calif.

[21] Appl. No.: 925,314

[22] Filed: Jul. 31, 1992

Related U.S. Application Data

[63] Continuation of Ser. No. 724,515, Jun. 28, 1991, abandoned, which is a continuation of Ser. No. 413,983, Sep. 28, 1989, abandoned.

[51] Int. Cl.$^5$ ............ G06F 3/14; H04N 1/40; G09G 5/10
[52] U.S. Cl. .................. 395/132; 395/131; 358/458; 358/460; 340/793
[58] Field of Search ......... 395/132, 131; 358/455, 358/457, 458, 460; 340/703, 793

[56] References Cited

U.S. PATENT DOCUMENTS

| | | | |
|---|---|---|---|
| 4,733,230 | 3/1988 | Kurihara et al. | 340/793 X |
| 4,866,534 | 9/1989 | Tada | 364/518 X |
| 4,920,501 | 4/1990 | Sullivan et al. | 364/518 |
| 4,937,761 | 6/1990 | Hassett | 364/518 |
| 4,956,638 | 9/1990 | Larky et al. | 340/793 X |
| 4,958,272 | 9/1990 | Wake | 364/521 X |
| 5,073,966 | 12/1991 | Sato | 358/457 X |

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

The distance between the intensity value of the base value (that is, the closest quantized intensity value less than the input intensity value) and the input intensity value is adjusted according to a mapping function between the size of the interval between the intensity values of the base value and the base value +1 (i.e., the next larger quantized intensity value) and the range of values in the dither matrix. By adjusting the distance between the base value and the input intensity value, the correct proportion of base values and base values +1 is maintained regardless of the difference in size of the interval and the range of the dither matrix, thereby insuring that the intermediate intensity values between quantized values are accurately simulated. In one embodiment of the present invention, the range of input intensity values is mapped to the full range of quantized intensity values by mapping the minimum and maximum input intensity values respectively to the minimum and maximum quantized intensity values and evenly distributing the remaining input intensity values between the minimum and maximum quantized intensity values. A second mapping function is then generated between the size of the interval and the size of the dither matrix to adjust the distance values and insure the accurate simulation of intermediate intensity values. In the resulting output, the accumulated error is reduced and the error is evenly balanced and distributed such that the image energy, and therefore the image brightness, is conserved.

14 Claims, 9 Drawing Sheets

| BASE | DISTANCE (δ) | ADJUSTED DISTANCE | AVERAGE OUTPUT | ERROR |
|---|---|---|---|---|
| bb | 0 | 0 | bb + 0.0 | -0.0 |
|  | 1 | 1 | bb + 1.1 | -0.1 |
|  | 2 | 2 | bb + 2.2 | -0.2 |
|  | 3 | 3 | bb + 3.3 | -0.3 |
|  | 4 | 4 | bb + 4.4 | -0.4 |
|  | 5 | 5 | bb + 5.5 | -0.5 |
|  | 6 | 6 | bb + 6.6 | -0.6 |
|  | 7 | 7 | bb + 7.7 | -0.7 |
|  | 8 | 8 | bb + 8.8 | -0.8 |
|  | 9 | 9 | bb + 9.9 | +0.8 |
|  | A | A | bb + A.A | +0.7 |
|  | B | B | bb + B.B | +0.6 |
|  | C | C | bb + C.C | +0.5 |
|  | D | D | bb + D.D | +0.4 |
|  | E | E | bb + E.E | +0.3 |
|  | F | F | bb + F.F | +0.2 |
| bb + 11 | 10 |  |  | +0.1 |

*Figure 6*

(b) ERROR FUNCTION: ERROR (hl)

METHOD AND APPARATUS FOR DITHERING GRAPHIC IMAGES

This is a continuation of application Ser. No. 07/724,515 filed Jun. 28, 1991, now abandoned which is a continuation of application Ser. No. 07/413,983, filed Sep. 28, 1989, now abandoned.

BACKGROUND OF THE INVENTION

1. Field of the Invention

The method and apparatus of the present invention relates to dithering techniques used to represent digital images. More particularly, the method and apparatus of the present invention relates to exploiting the full dynamic range of intensities and distributing the quantization error over the entire intensity range.

2. Related Applications

The present invention is related to U.S. applications Ser. No. 07/909,125, filed Jul. 6, 1992, entitled "Method and Apparatus For Vector Aligned Dithering", U.S. application Ser. No. 07/413,991, filed Sep. 28, 1989, entitled "Method and Apparatus for Non-Linear Dithering of Digital Images", and U.S. Pat. No. 5,164,717, entitled "Method and Apparatus for the Dithering of Anti-Aliased Vectors", and are herein incorporated by reference.

3. Art Background

A picture or image may be thought of as a continuous representation of the object projected. It is often desirable to represent images on a digital computer display device such as a monitor or a printer. However, a computer and its output devices are binary in nature. A computer display comprises a grid of display elements, referred to as pixels, which can either be in one of a plurality of on states indicative of its intensity, in which the pixel location is illuminated, or in the off state in which the pixel location is not illuminated. In order to display continuous images, the continuous images must be converted to discrete representations corresponding to the pixel locations on the display device. A digital image is quantized in both the spatial domain and the intensity domain.

The amount of memory available dictates the quantized levels available to represent the image. If the resolution of either sample space (i.e. spatial and intensity) drops below a threshold (due to memory limitations), the eye will detect the discrete boundaries between samples. In the intensity domain, insufficient resolution is marked by the presence of artificial edges delimiting the transitions between regions of incremental intensity. Other undesirable visible effects, such as patterning, color shifting and biasing, are introduced due to the visible thresholding between quantized intensity levels.

To minimize the undesirable effects, a technique referred to as dithering or digital halftoning, is used. Dithering is a technique which permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels. Typically, this technique works well, since the eye naturally blends individual pixel values such that only the average intensity in the surrounding area or neighborhood is perceived. For more information on dithering, see Ulichney, *Digital Halftoning* (1987, MIT Press); Foley & Van Dam, *Fundamentals of Interactive Computer Graphics*, p. 597-602 (Addison-, Wesley, 1984).

Several types of dithering techniques exist. The types of dithering algorithms are distinguished by the way the neighborhoods are chosen. In the technique of ordered dither, the neighborhoods are chosen according to a two dimensional set of values, referred to as the dither table or dither matrix, which is tiled into the image's coordinate space. Typically for area dither, the table has the same number of row and column elements and the total number of entries in the table equals the number of simulatable intensity levels between the quantized levels. The values contained in the table are used to make decisions about which quantized intensity value will be output at each position, that is, should the intensity value be quantized to the quantized value above or below the original intensity value. The dither table values are different at each x,y coordinate location such that when a constant input intensity is dithered over some area, the output values will alternate in some pattern between the upper and lower quantized intensity levels.

The ordered dither process is explained in reference to FIG. 1. Process 1.0 determines the appropriate index into the dither matrix based on the x-y coordinates of the current pixel. Conceptually, the idea is to "tile" the dither matrix into the image coordinate space, thereby replicating each entry once every n pixels, where n is the dimension of the dither table. The indices to the matrix, i-j, are determined according to the following equations:

$$i = x \bmod n$$

$$j = y \bmod n$$

If n is a power of two, then it is possible to utilize the least significant bits of the x-y screen coordinates for indexing the dither matrix. For example, if the dimension of the dither matrix is 4×4, then the 2 least significant bits of the x-y coordinates will provide the required modulo-4 indexing.

At process 2.0, the dither values are retrieved from the matrix according to i-j dither indices determined. By the nature of the problem, the output intensity scale has fewer entries than the input intensity scale. In order to quantize the input value, there must be a predetermined correspondence between each level on the output scale to a value on the input scale. It is the task of process 3.0 to determine the input-scale base value, which is the input scale value that is nearest to but not greater than the original input intensity and which directly corresponds to a value in the stored range of intensities (output intensity values). The next process, 4.0, determines the value in the stored range of quantized intensity levels that corresponds to the input-scale base value. This value will be referred to as the "stored range base value".

At process 5.0, the difference between the input intensity value and the intensity of its input-scale base value is determined. The result, always guaranteed to be greater than or equal to zero, is the delta value passed along to process 6.0. Process 6.0 is the pivotal dither process, comparing the delta value to the dither value and outputting either the stored range base value or the next higher value. Specifically, if the delta value is less than or equal to the dither value, the stored range base value is output; if delta is greater than the dither value, then the stored range base plus one is output. The output from process 6.0 is the quantized pixel value that is deposited into the pixel store (e.g. a frame buffer).

Although quantized values are stored, these values are typically mapped back to an intensity scale with a greater intensity range for display viewing. That is the task of process 7.0, which is usually implemented by lookup-tables lying between the frame buffer output and the video display input. (This is not part of dithering per se, but is utilized for reconstruction of the dithered image for viewing.)

By performing processes 1.0 through 6.0 on successive input values, dithering causes values both greater than and less than the input intensity to ultimately be displayed, producing regions over which the overall average intensity is approximately equal to the original input intensity.

The dithering process is applied to all portions of the digital image for all intensities. Linearly mapping the output intensity scale, typically via look-up tables, to a range such as 0–255, implies that the dithered pixel values are quantized with even distribution of error throughout the entire range of inputs. However, an error distribution problem arises during the dithering process. The error is not evenly distributed or balanced such that the high end of the intensity scale is not mapped to the highest portions of the output intensity scale. That is, the high intensity values are clipped resulting in the loss of image brightness.

The problem may best be understood by first examining the error distribution with regards to simplified situation of quantization without dithering (note that the illustration and examples are set forth in hexadecimal numbers).

Consider an 8 bit input value hl, where h=the number corresponding to the most significant 4 bits, and l=the number corresponding to the least significant 4 bits. The most expedient way to compress hl into 4 bits is to truncate its least significant half. Specifically, if q(hl) is the 4 bit result after quantization, then $$q(hl) = (hl >> 4) \ \& \ 0f$$
$$= 0h$$

The value q(hl), which is stored in the 4 bit frame buffer, must undergo some output mapping (typically via a lookup table) for display. Since q(hl) was created by a right shift of 4 bits, a logical output mapping may be one which performs a complementary 4 bit shift to the left. The output function, out (), will have sixteen entries:

$$out(i) = i0, \text{ where } i \epsilon [0, 0f]$$

Therefore, for some quantized value q(hl), the observed output will be $$out[q(hl)] = out(0h) = h0$$

Over some spatial domain composed entirely of input value hl, the average output value is $$\text{average } (hl) = h0$$

and, for regions of intensity hl, the average error per pixel is $$\begin{aligned} \text{error}(hl) &= hl - \text{average}(hl) \\ &= hl - h0 \\ &= 0l \end{aligned}$$

Given an input scale of 0-ff, FIG. 2a illustrates the output resulting from quantization by truncation, and FIG. 2b the average error incurred. A problem that is immediately clear from FIG. 2a is that, although the low end of the intensity scale maps properly (from 0 to 0), the high end clipped to a maximum of fifteen graduations short of the original maximum intensity. From FIG. 2b it can be seen that the error function swings between 0 and f, which is excessive particularly at intensities approaching zero. From an observer's point of view, this will translate into the artificial contours in the output image. In addition, the quantization error is distributed throughout the intensity scale, but is all of the same sign. As a result, overall image energy is not conserved and the brightness of the 4 bit image is noticeably attenuated.

Typically, prior art methods for 8 bit to 4 bit dithering rely upon the same basic principle as the direct quantization method described above, that of shifting out the least significant four bits. The twist is that, before the bit-shift, an entry from the dither table is added to the incoming pixel value and the result is clipped to ff.

The strategy will only work if the dither table contains entries in the range 0–0f, as this range of values will cause a maximum increment of 1 in the high 4 bits of the input which the addition is performed. Correspondingly, when the result is shifted 4 bits to the right, the quantized value for some input hl (as defined earlier) will be either h or h+1, depending on the dither value.

Analytically, the equation of the quantized value q(hl) is $$q(hl) = [\min[ff,(hl+0d)]>>4] \ \& \ 0f$$

where the value d is an entry from the dither table. The equation of the quantized value (hl) may also be described algorithmically:

```
if (h = f) then          q(hl) = 0f
else
if [(0l + 0d) < 10] then q(hl) = 0h
else                     q(hl) = 0h + 01
```

As was the case in the earlier description, the 4 bit value q(hl) must be mapped to the full range of displayable intensities for viewing. Using the same sixteen-entry output function, out (), $$out(i) = i0, \text{ where } i \epsilon [0, 0f]$$

the displayed outputs will then be

```
if (h = f) then           out(q(hl)) = out (0f) = f0
else
if ((0l + 0d) > 10) then  out(q(hl)) = out (0h) = h0
else                      out(q(hl)) = out(0h + 01) =
                                        h0 + 10
```

The average output has more relevance now than it did in the straight quantization illustration. Since the purpose of dithering is to create an ensemble average over the area of the dither table which is equal to the input value, then evaluating the average will enable us to calculate the net error from dithering. Based on the three possible cases for out (q(hl)), the average is determined according to the following:

if $(h = f)$ then  average $(hl) = f0$
else  average $(hl) = [(10 - 0l)(h0) + (0l)(h0 + 10))/10$
$= [10(h0) - 0l(h0) + 0l(h0) + 10(0l)]/10$
$= [10(h0 + 0l)]/10$
$= 10(hl)/10$
$= hl$ The error, averaged over all pixels in the dither table's neighborhood, is therefore if $(h = f)$ the  error$(hl) = hl$ − average$(hl) = hl - f0 = 0l$
else  error$(hl) = hl$ − average$(hl) = hl - hl = 0$ FIGS. 3a and 3b respectively illustrate the average output and error functions. Although the results show zero error for all inputs between 0 and f0, the fifteen highest intensities, f1–ff, are lost, just as the fifteen highest intensities were lost in the straight quantization illustration. Thus, for all images which contain a significant number of pixels in the high intensity range there will be a perceived loss of brightness due to the clipped high intensity values. In addition image energy is not conserved because the error is neither evenly distributed nor balanced.

Another problem which frequently occurs is the error introduced when the size of the interval (i.e., the number of values between prequantized intensity values) is not equal to the number of values in the dither matrix. The dither matrix values are arranged with the assumption that the number of values in the interval equals the number of values in the matrix. When not equal, the correct proportion of base and base +1 intensity values does not occur and the accuracy required to simulate the intermediate intensity values is diminished. For example, if the dither matrix contains 16 values (0–15) and the size of the interval was 4 (0–3), the distance value can never be greater than 4. Thus, dither matrix values 5 through 15 would always result in the base +1 intensity value being output resulting in a larger number of base +1 intensity values than the proportional amount needed to best simulate the intermediate intensity levels.

SUMMARY OF THE INVENTION

It is therefore an object of the present invention to provide a method and apparatus for dithering digital images in which an accurate proportion of occurrence of intensity values is generated whereby the average of the intensity values which occur simulates the desired intermediate intensity values.

It is an object of the present invention to provide a method and apparatus for dithering digital images in which the full dynamic range of output intensities is utilized.

It is an object of the present invention to provide a method and apparatus for dithering in which the quantization error is evenly distributed across the range of intensity values.

In the method and apparatus of the present invention, the distance between the base value (that is, the closed quantized (or scale) intensity value less than the input intensity value) and the input intensity value is adjusted according to a mapping function between the size of the interval between the base value and the base value +1 (i.e., the next larger quantized intensity value) and the range of values in the dither matrix. By adjusting the distance between the base value and the input intensity value, the correct proportion of base values and base values +1 is maintained regardless of the difference in size of the interval and the range of the dither matrix, thereby insuring that the intermediate intensity values between quantized values are accurately simulated.

In another embodiment of the present invention, the range of input intensity values is mapped to the full range of quantized intensity values by mapping the minimum and maximum input intensity values respectively to the minimum and maximum quantized intensity values and evenly distributing the remaining input intensity values between the minimum and maximum quantized intensity values. A second mapping function is then generated between the size of the interval and the size of the dither matrix to adjust the distance values and insure the accurate simulation of intermediate intensity values. In the resulting output, the accumulated error is reduced and the error is evenly balanced and distributed such that the image energy, and therefore the image brightness, is conserved.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

The objects, features and advantages of the method and apparatus of the present invention will be apparent from the following detailed description of the invention in which:

FIG. 6 is a table which sets forth the average output and error for incremental steps between base values in the preferred embodiment of the present invention.

DETAILED DESCRIPTION OF THE INVENTION

General System Configuration

Figure 1:
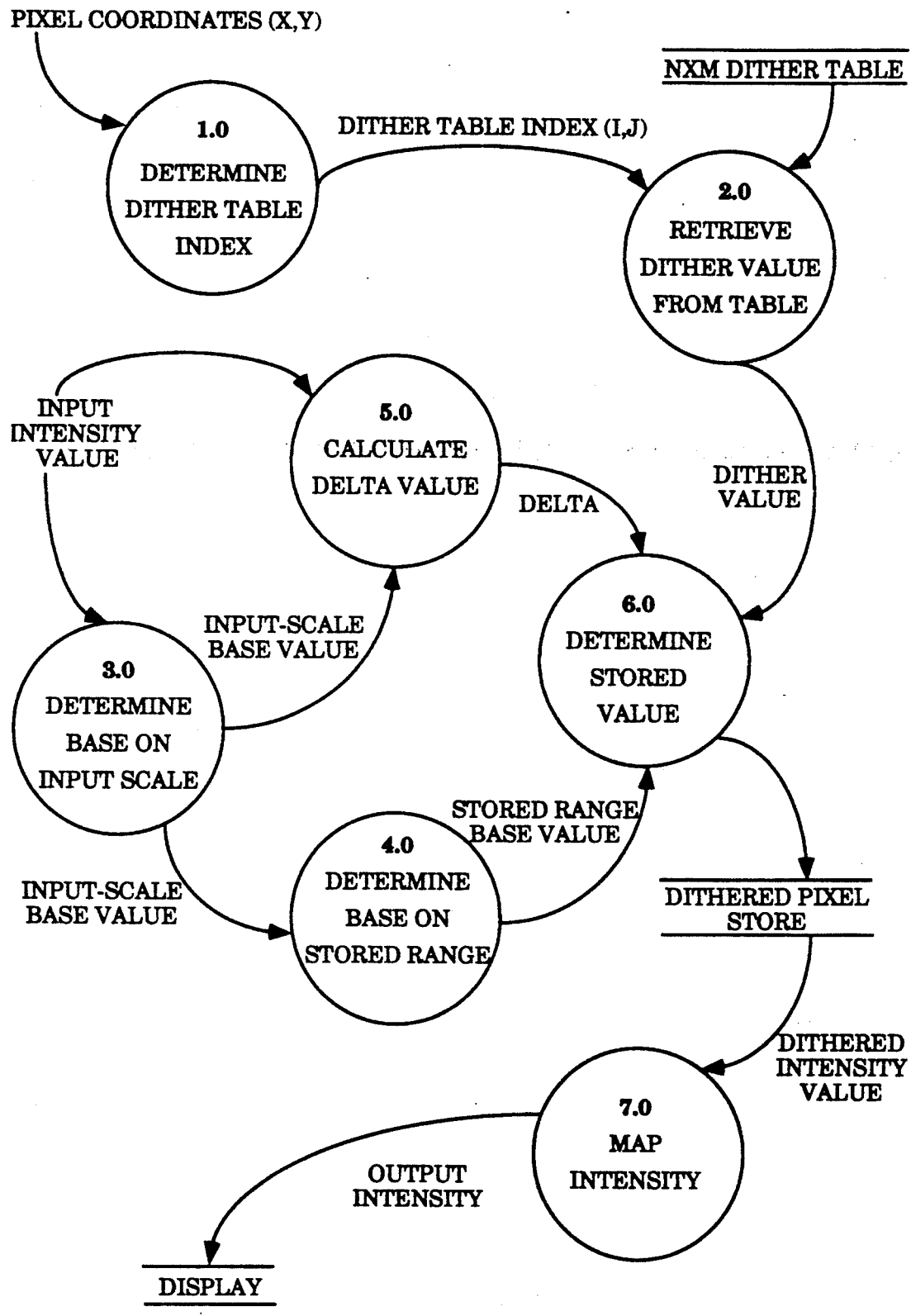
FIG. 1 is a flow diagram illustrative of a prior art ordered dithered process.
Figure 2A:
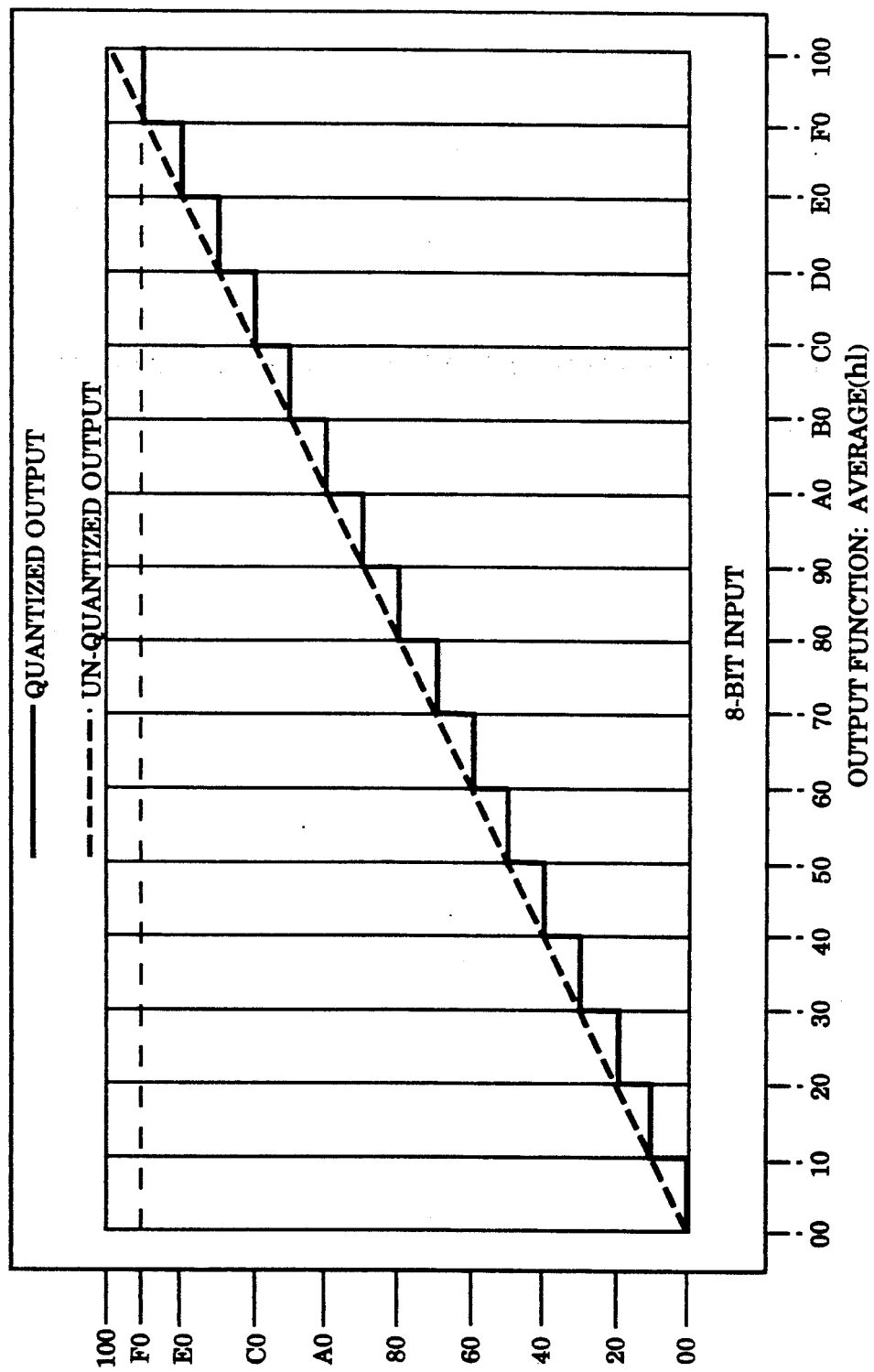
FIGS. 2a and 2b graphically illustrate the outputs after quantization and its corresponding error function.
Figure 2B:
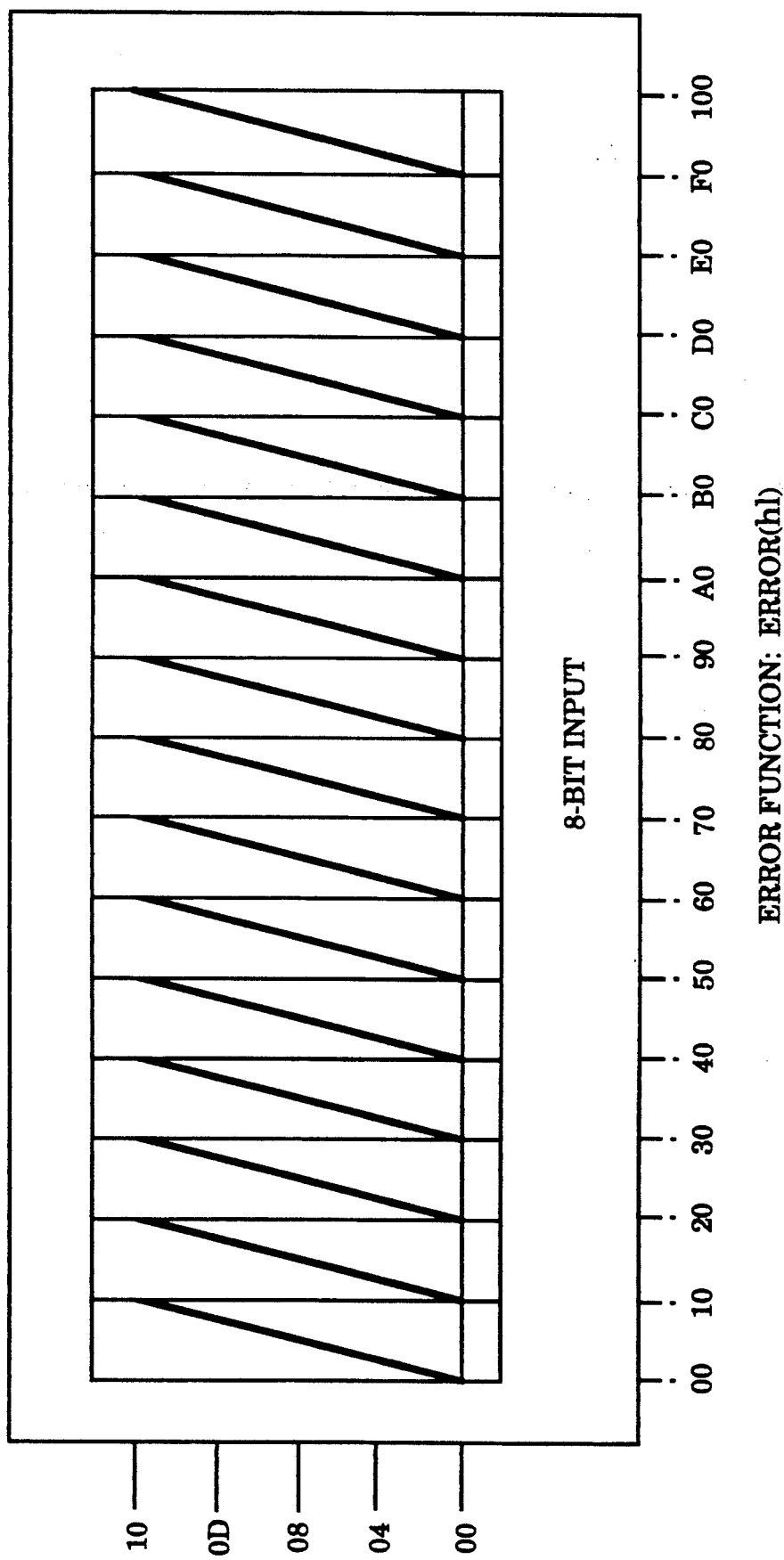
Figure 3A:
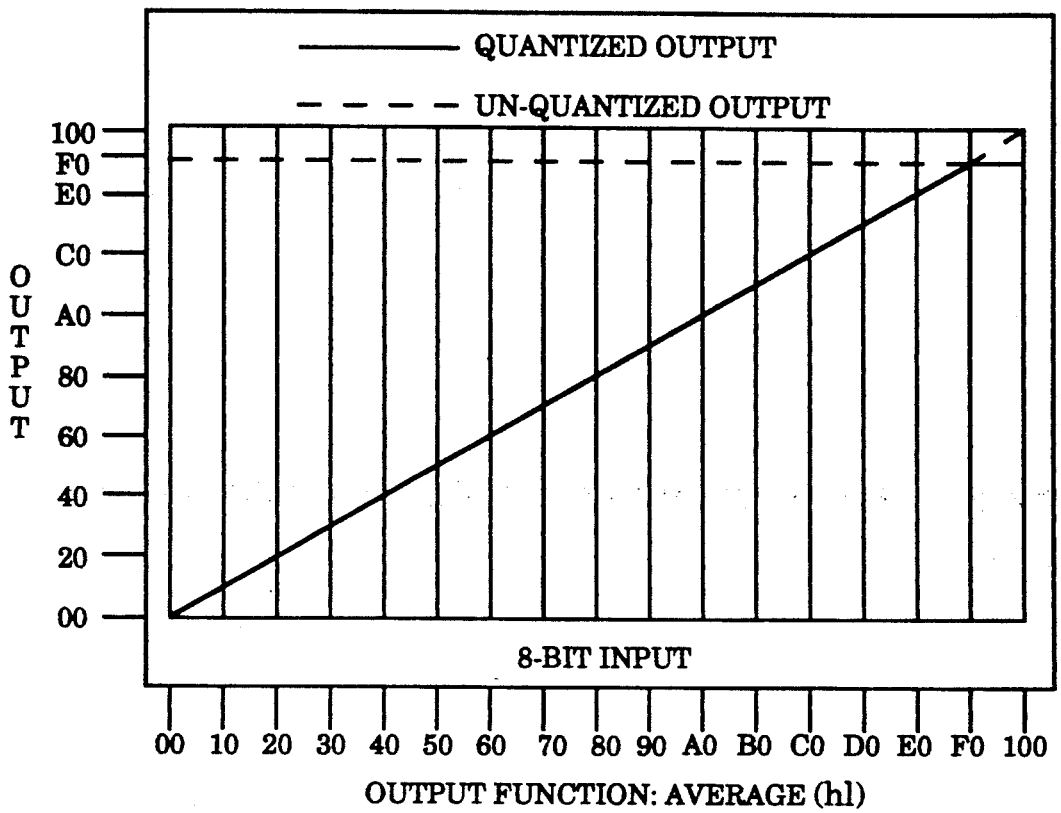
FIGS. 3a and 3b graphically illustrate the output after dithering and its corresponding error function.
Figure 3B:
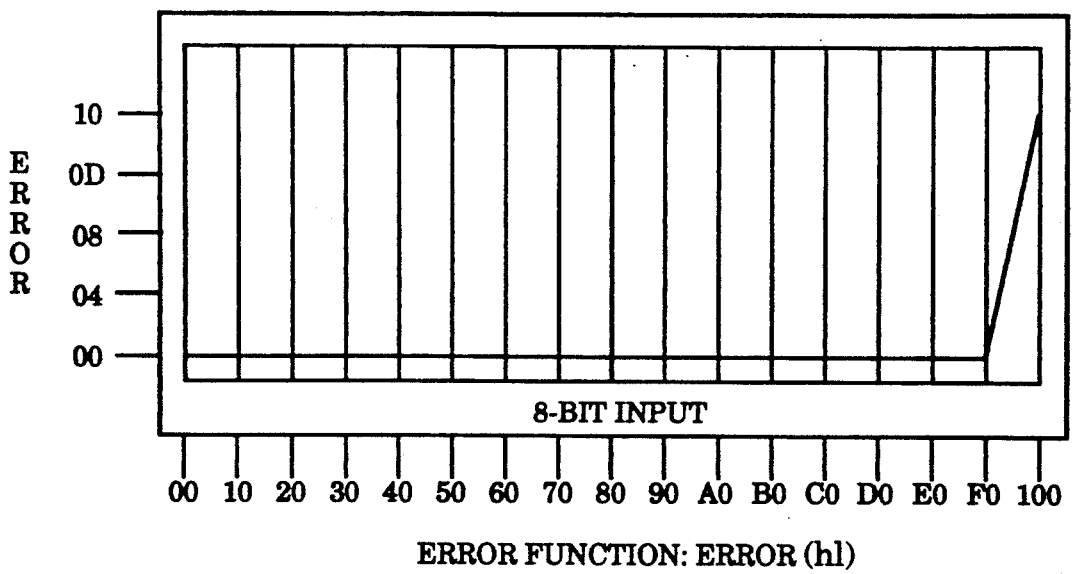
Figure 4:
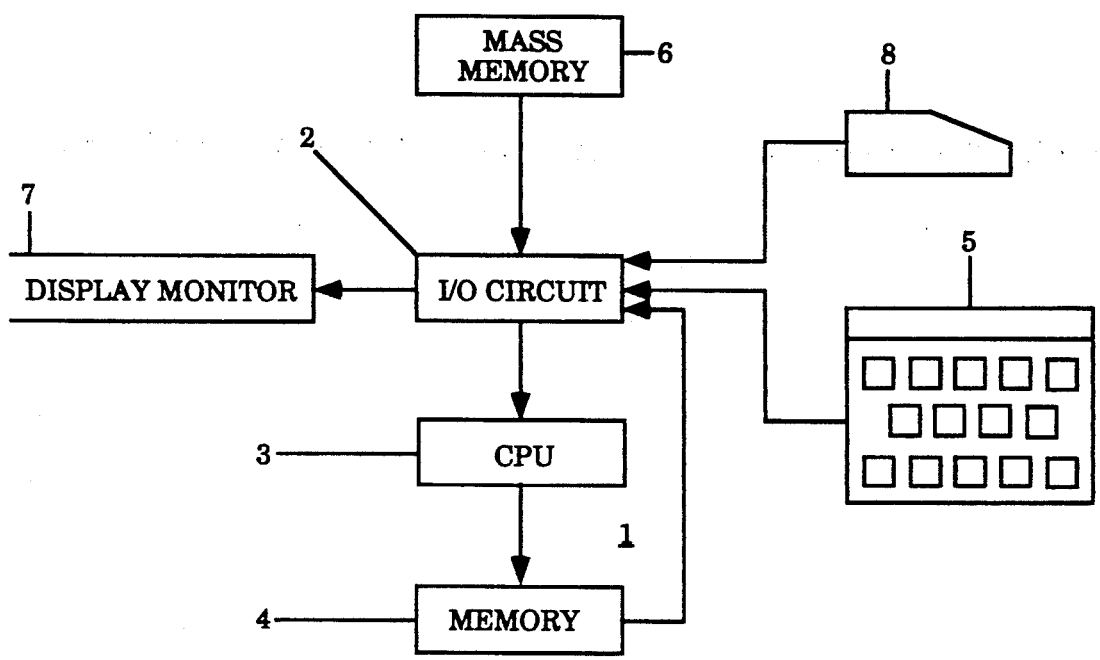
FIG. 4 depicts the illustrative computer system employed in the system of the present invention.

FIG. 4 shows a typical computer-based system for the dithering of digital images according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 4 is an input device 5, shown in typical embodiment as a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 displays the graphic images, generated according to the process of the present invention. A cursor control 8 is used to select command modes and provides a more convenient means to input information into the system.

Process Description

An improved procedure for dithering which provides greater accuracy in representing the intermediate intensity values. In the prior art dither process, the distance separating the input intensity value from its base value (also referred to as the "input scale base value") is computed and compared to a dither value extracted from the dither matrix to determine whether the output intensity value equals the intensity of base value or the base value +1. In the present invention, when the size of the range of intermediate intensity values between the intensity values corresponding to the base and base+1 values and the size of the range of values in the dither matrix are not equal, the distance is adjusted according to the mapping function, generated between the range of input intensity values between the intensity values corresponding to the base and base+1 values and the range of values in the dither matrix. This adjusted distance value is compared to the dither value retrieved from the dither matrix to determine whether the output intensity is set to equal the intensity of the base value or the base value +1.

The effect of the adjusted distance is to provide a more precise comparison of the dither value retrieved from the dither matrix and the distance value such that the base intensity values are more accurately distributed throughout the digital image, resulting in a more accurate representation of the intermediate intensity values.

The preferred embodiment of the present invention will be described in the context of an 8 bit/pixel component to 4 bit/pixel component dithering process utilizing the order dither process described in the Art Background section of this Specification. However, as will be clear from review of this Specification, the present invention is not limited to an 8 bit to 4 bit dithering process. Furthermore, the invention may be employed in conjunction with other dithering techniques, such as non-linear and vector aligned dithering, respectively, described in U.S. patent application Ser. No. 07/413,991, filed Sep. 28, 1989, entitled "Method and Apparatus for the Non-Linear Dithering of Digital Images" and U.S. patent application Ser. No.

07/909,125, filed Jul. 6, 1992, entitled "Method and Apparatus for Vector-Aligned Dithering".

Figure 5A:
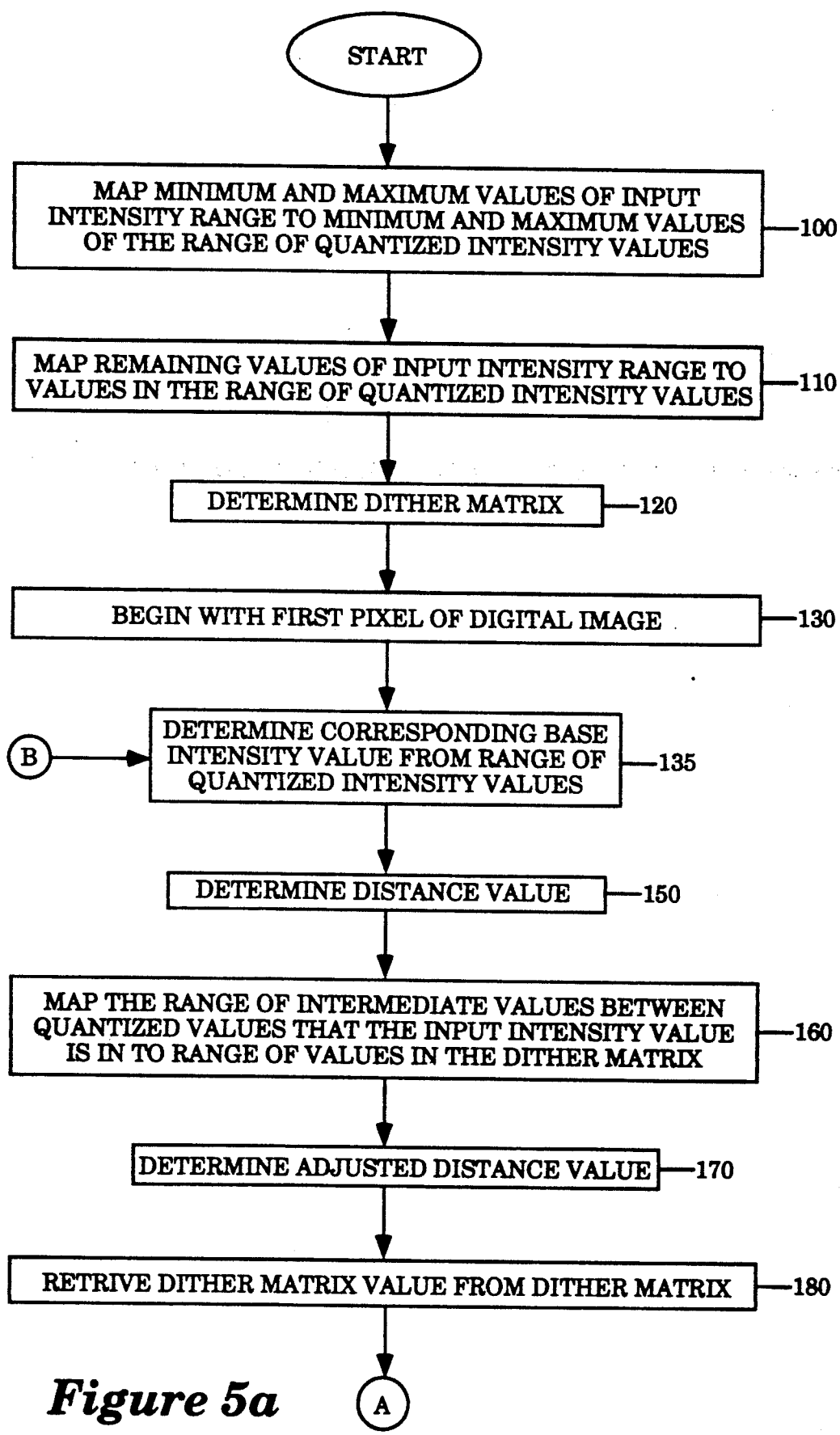
FIGS. 5a and 5b are flow charts describing a preferred embodiment of the present invention.
Figure 5B:
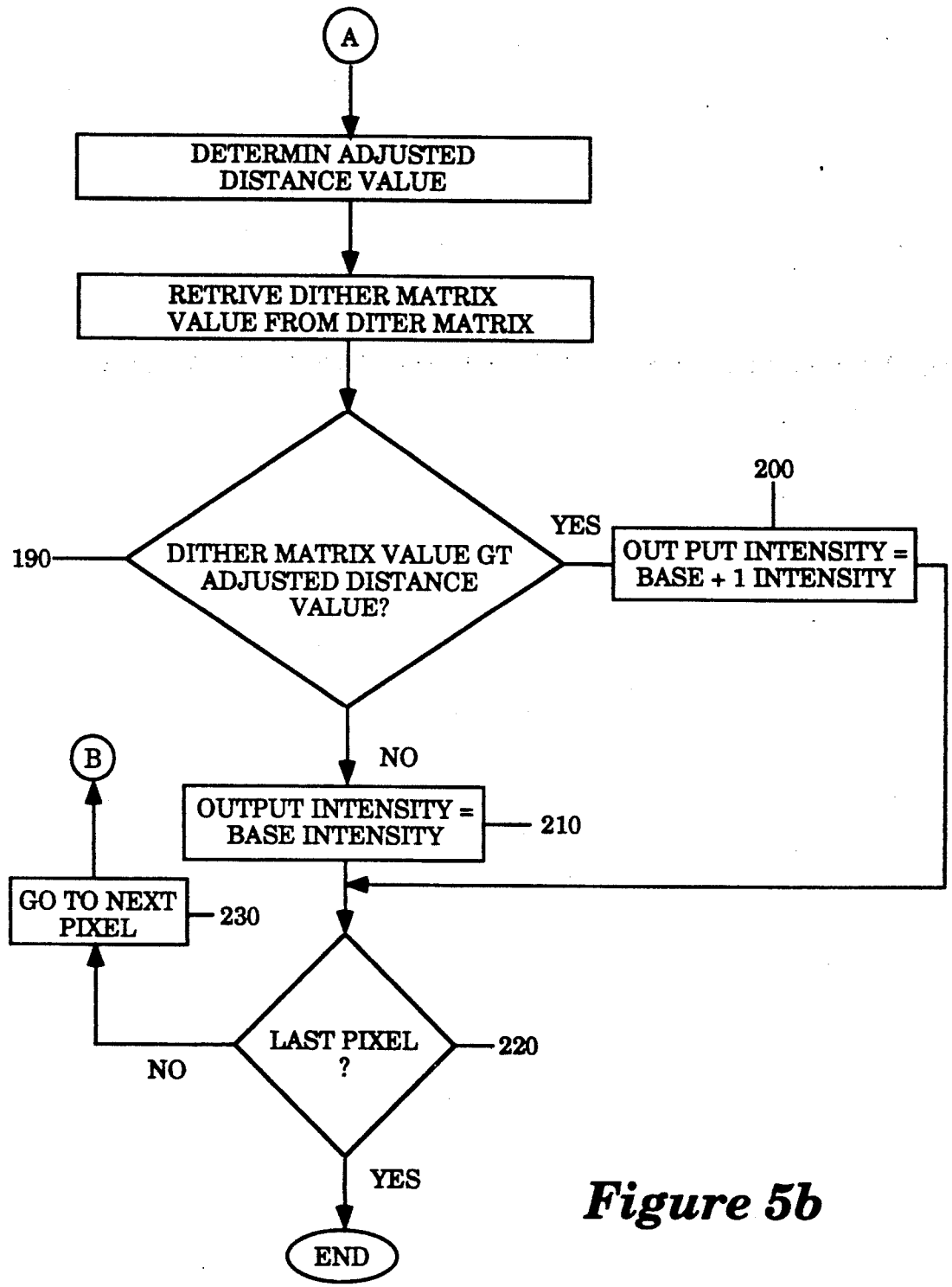

The process is more distinctly described by the preferred embodiment illustrated by the flow chart of FIG. 5. A mapping function is first generated between the range of input intensity values and the range of quantized intensity values such that a bi-directional mapping is generated between contiguous sub-ranges of input intensity values and the range of quantized intensity values. At block 100, the minimum input intensity value is mapped to the minimum quantized intensity value and the maximum input intensity value is mapped to the maximum quantized intensity value. At block 110, the remaining values in the input intensity range are mapped to the remaining values in the range of quantized intensity values. Preferably, the values are evenly distributed between the maximum and minimum values. However, the quantized intensity values may be unevenly distributed, depending upon the application and desired effect. For example, it may be desirable to decrease the interval spacing between quantized intensity values in the low range of intensity values because the eye is more sensitive to changes in intensity at low intensities and by decreasing the interval spacing in the low intensity range the quantized intensity values are closer to the original input intensity values.

At block 120, the dither matrix to be used is determined. The values in the matrix and the shape of the dither matrix is dependent upon the dithering method employed. For example, a 4×4 matrix comprising values between 0 and 15 may be used to dither an 8 bit/pixel representation to a 4 bit pixel representation. At block 130, the first pixel of the digital image to be dithered is retrieved, and at block 135 the corresponding base values from the range of quantized intensity values is determined according to the mapping function between the range of input intensity values and output quantized intensity values. The base value is the input scale value corresponding to an output quantized intensity value which is closest to but not greater than the input intensity value. Depending upon the following process, the output intensity value will either be the intensity value of the base value or the intensity value of the base value +1 (that is, the next larger output quantized intensity value).

At block 150, the distance value is determined. The distance value (also refered to as a "delta value") is computed according to the difference between the output quantized intensity value corresponding to the base value and the input intensity value. At block 160, a second mapping function is generated between the interval between quantized intensity values in which the input intensity value lies and the range of values in the dither matrix. By performing this mapping, at block 170, the distance value is adjusted for a more accurate comparison by minimizing the error introduced because the range of the size of the values of the interval and the range of values in the dither matrix are unequal. The adjusted distance value is determined from the mapping function of the range between intermediate values between quantized values and the range of values in the dither matrix. At block 180, the dither matrix value from the dither matrix is retrieved. This value at block 190 is then compared against the adjusted distance value. If the adjusted distance value is greater than the dither matrix value, at block 200, the output intensity value is set to the intensity of the base value +1. If the adjusted distance value is less than or equal to the dither matrix value, the output intensity equals the intensity of the base value. This process continues via blocks 220 and 230 until the last pixel is evaluated. The resulting dithered image is a more accurate representation of the original image due to the fact that the dither compare values and dither matrix values are mapped to the same range resulting in more accurate comparisons.

Alternatively, in another embodiment, the output intensity value may be determined to be the intensity of the base value or the base value $-1$. In this embodiment, the base value is the element sequence number corresponding to the quantized intensity value which maps to a value on the input intensity scale that is closest to but not less than the input intensity value. If the dither matrix value is less than the adjusted distance value, the output intensity value is the intensity of the base value $-1$. If the dither matrix value is greater than or equal to the adjusted distance value, the output intensity value is set to the base value.

The preferred embodiment of the present invention is further illustrated by the following numerical example in which:

The input range of intensity values is from 10 to 30; and

The number of quantized elements in the input scale is 6.

Therefore, a mapping function is generated between the input range of intensity values:

10 11 12 13 14 15 16 17 18 19 20 21 22 23 24 25 26 27 28 29 30 and the range of the input scale:

0 1 2 3 4 5 6

The minimum and maximum values of the input range of intensity values (10,30) are respectively mapped to the maximum and minimum elements of the input scale (0,6). The remaining values of the input range of intensity values (11-29) are then mapped in contiguous groups or sub-ranges to the elements of the input scale. Preferably, the input scale elements are distributed as evenly as possible across the remaining input intensity values. This may be accomplished by computing uniform interval spacing for the mapping. The interval spacing may be computed according to the following equation:

$$\frac{n-m}{k-1}$$

Where m is the minimum intensity value of the input intensity range, n is the maximum intensity value of the input intensity range and k is the number of quantized elements in the input scale. Thus continuing with our numerical example, the interval spacing would be $$\frac{30-10}{6-1} = 4$$

The intensity values 10, 14 18, 22, 26 and 30 are the output quantized intensity values to be utilized in the dithering process. Thus, the mapping is:

| Input Intensity Value | Input Scale | Output Intensity Value |
| --- | --- | --- |
| 10, 11, 12, 13 | 0 | 10 |

| Input Intensity Value | Input Scale | Output Intensity Value |
|---|---|---|
| 14, 15, 16, 17 | 1 | 14 |
| 18, 19, 20, 21 | 2 | 18 |
| 22, 23, 24, 25 | 3 | 22 |
| 26, 27, 28, 29 | 4 | 26 |
| 30 | 5 | 30 |

Alternatively, the input scale elements are not evenly distributed among the remaining input intensity values. Instead, taking into consideration the fact that the eye is more sensitive to changes in intensity at low intensities than at high intensities, a larger proportion of the input scale elements are mapped to the lower intensity portion of the input range of intensity values. The result of the uneven distribution is that the interval spacing is smaller at lower intensities and a lesser number of intermediate intensity values need to be simulated, and at the higher intensities, where the eye is less sensitive to changes in intensity, the interval spacing is larger and a greater number of intermediate intensity values need to be simulated.

The input intensity values comprising the output quantized intensity values and intermediate intensity values (those values between quantized intensity values), are visually simulated by arrangement of the quantized values in predetermined patterns such that the eye integrates over an area and perceives the desired intensity values.

The output intensity values are determined by comparing the adjusted distance value with a value retrieved from the dither matrix. The result of the comparison determines if the output dither value is the intensity corresponding to the base value or base value+1. In the present example, if the input intensity value is 20, the base value is 2, which corresponds to the output intensity value of 18, because 18 is the closest output intensity value less than or equal to the input intensity value. The distance value is computed to be the difference between the input intensity value and the base intensity value. In the present example, the distance value is equal to: 20−18=2.

To provide a more accurate comparison, and therefore a more accurate pattern of output intensity values when the range of distance values do not equal the range of values in the dither matrix, the dither compare value is adjusted according to the mapping function between the range of intermediate intensity values between the base value and base value +1 (that is, the size of the interval) and the range of values in the dither matrix. The mapping function addresses the problem, as is present in the example, that the dither matrix has a range of 16 values while the interval has a range of only 4 values.

The mapping function is generated according to the proportion of the output quantized intensity values, that is, the proportion of the range of values in the interval between output intensity values which correspond to the base value and the base value +1, and the range of values in the dither matrix. The proportion may be determined according to the following equation:

$$a = \frac{I - B1}{B - B1}$$

where a is the proportion, I is the input intensity value to be simulated, B is the quantized intensity value which corresponds to the base value and B1 is the quantized intensity value which corresponds to the Base value +1.

Therefore the adjusted distance value is aR where R is the range of values in the dither matrix.

In the present example, a mapping function is generated between the interval 18–22 having 4 distance values 0–3, and the range of dither matrix values 0–15 (because the image is dithered from an 8 bit representation to a 4 bit representation).

The proportion, a, is determined:

$$a = \frac{22 - 20}{22 - 18} = \frac{2}{4} = \frac{1}{2}$$

and a is multiplied by the number of dither values in the range (16) to get the adjusted distance value:

$$D_{adj} = \tfrac{1}{2} * 16 = 8$$

Therefore, according to the mapping function, the distance 2, is the adjusted distance value 8 and the value of is compared to the value retrieved from the dither matrix to determine whether the output intensity value is the intensity value of the base value or the base value +1.

The process may best be understood by a more detailed example of an 8 bit to 4 bit dithering process (it should be noted in the following example that the numbers are described in hexadecimal format.). If hl represents an 8 bit input, q(hl) is the stored 4 bit value resulting from dithering, and out () is the output lookup table mapping function, the ideal output mapping function should linearly map (0,f)→(0,ff). For a sixteen-entry look-up table employed for a 8 bit to 4 bit dithering process, linearity may be achieved with the following function:

$$out(i) = ii, \text{ where } i\epsilon[0, 0f]$$

The output function out (i) defines an intensity scale for q(hl) which ranges from 0 to ff, and which has a separation of seventeen intensities between steps.

Thus a first mapping function is generated resulting in the mapping:

| input intensity value | quantized element sequence number | quantized intensity value |
|---|---|---|
| 0–16 | 0 | 0 |
| 17–33 | 1 | 17 |
| 34–50 | 2 | 34 |
| 51–67 | 3 | 51 |
| 68–84 | 4 | 68 |
| 85–101 | 5 | 85 |
| 102–118 | 6 | 102 |
| 119–135 | 7 | 119 |
| 136–152 | 8 | 136 |
| 153–169 | 9 | 153 |
| 170–186 | 10 | 170 |
| 187–203 | 11 | 187 |
| 204–220 | 12 | 204 |
| 221–237 | 13 | 221 |
| 238–254 | 14 | 238 |
| 255 | 15 | 255 |

To properly quantize the incoming intensity value, two output intensity levels are determined, bb and bb+11, between which hl lies. Once these two values are determined, the values can be spatially combined in proportionate numbers to simulate the intensity level hl.

(To simplify the nomenclature used in the following description, the 8 bit value bb is referred to as the base for input hl and the 4 bit value which produces output bb is simply 0b, and will also be referred to as the base where the context is appropriate.)

Once the base value for the input value hl is determined, the distance separating the input value from the intensity value of its base value is calculated. If this distance is identified as $\delta$, then $$\delta = hl - bb$$

In the intensity domain, a, which is equal to the adjusted value of $\delta$ according to the mapping function between the range of intermediate intensity values and the range of values within the dither matrix, also indicates the proportions of quantized intensity values corresponding to bb and bb+11 that combine to produce the intensity hl:

$$hl = [(11-a)(bb) + (a)(bb+11)]/11$$

and thus the proportions of the pixels valued at bb and bb+11 that must be output in order to simulate intensity hl are also determinable from the distance, a.

The dither table employed here contains a set of singly-occurring numbers spanning a linear range. In the dithering process a is compared to the dither table value at the current location and bb or bb+11 is output depending on the value of the inequality.

A fourth order dither table is used, wherein sixteen table entries (ranging from 0 to 0f) are used to compare with seventeen possible values of $\delta$ (because there are seventeen incremental steps between bb and bb+11). The problem can be circumvented by adjusting the distance value $\delta$ according to the mapping function between the interval spacing and the range of values in the dither matrix. In the present example, because there is a singular value difference between the (seventeen) interval and the range of values in the dither matrix (sixteen), the mapping function utilized simply collapses the output mapping for distances 8 and 9 to the same value if its magnitude exceeds half the distance between bb and bb+11. Thus, instead of comparing $\delta$ with the dither table entry, the adjusted distance value is computed. The second mapping function computes adjusted distance to be $\delta$ for $\delta \leq 8$ and $\delta - 1$ for $\delta > 8$ resulting in the mapping:

| distance value | adjusted distance value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 8 |
| 10 | 9 |
| 11 | 10 |
| 12 | 11 |
| 13 | 12 |
| 14 | 13 |
| 15 | 14 |
| 16 | 15 |

The effect is to collapse the output mapping for distances of 8 and 9 to the same value, thereby reducing the number of incremental steps of the interval between base values from seventeen to sixteen. With only sixteen steps between base values bb and bb+11, the increment per step is (bb+11−bb)/10 = 11/10 = 1.1, resulting in an accumulated error of 0.1 per step. In addition, the error function climbs only to a maximum magnitude of 0.8 (for $\delta = 8$) before reversing its sign (for $\delta = 9$) and subsequently decreasing back to zero. FIG. 6 shows the average output and error for the incremental steps between base values.

The dithering process of the present example can be summarized algorithmically as follows:

```
b = ((hl − 0h) >> 4 & 0f       /*base*/
δ = hl − bb                     /*distance*/
a = δ
if(δ > 08)then a = a − 1        /*adjusted distance*/
if(a > d)then q(hl) = 0b + 1    /*d is value retrieved from dither matrix*/
else           q(hl) = 0b
```

Utilizing the earlier output mapping function, the outputs are determined as follows:

$$\text{if } (a > d) \text{ then } \text{out}(q(hl)) = \text{out}(0b + 01) = bb + 11$$
$$\text{else } \text{out}(q(hl)) = \text{out}(0b) = bb$$

Now, to determine the average output over the spatial domain of the dither table, the occurrences of bb and bb+11 are averaged:

$$\text{average}(hl) = [(10 - 0a)(bb) + (0a)(bb + 11)]/10$$
$$= [(10)(bb) - (0a)(bb) + (0a)(bb) + (0a)(11)]/10$$
$$= [(10)(bb) + (0a)(11)]/10$$
$$= bb + (aa/10)$$
$$= bb + a + (a/10)$$

The error function for input hl may be determined as follows:

$$\text{error}(hl) = hl - \text{average}(hl)$$
$$= hl - bb - a - (a/10)$$
$$= \delta - 0a - (a/10)$$

and can be categorized into three cases:

$$\delta = 0: \quad \delta = 0 \rightarrow a = 0 \tag{1}$$

$$\therefore \text{error}(hl) = \delta - 0a - (a/10) = 0 - 0 - 0 = 0$$

$$0 < \delta \geq 08: \quad 0 > \delta \leq 8 \rightarrow a = \delta \tag{2}$$

$$\therefore \text{error}(hl) = \delta - a - (a/10) = \delta - \delta - (\delta/10) =$$

-continued $$-(\delta/10) - (08/10) \leq \text{error}(hl) \leq -(1/10)$$

$$08 < \delta \leq 10: \quad 08 < \delta \leq 10 \rightarrow a = \delta - 1 \quad (3)$$

$$\therefore \text{error}(hl) = \delta - a - (a/10. = \delta - \delta + 1 - ((\delta - 1)/10)$$

$$1 - ((\delta - 1)/10)(08/10) \leq \text{error}(hl) \leq (1/10)$$

Figure 7A:
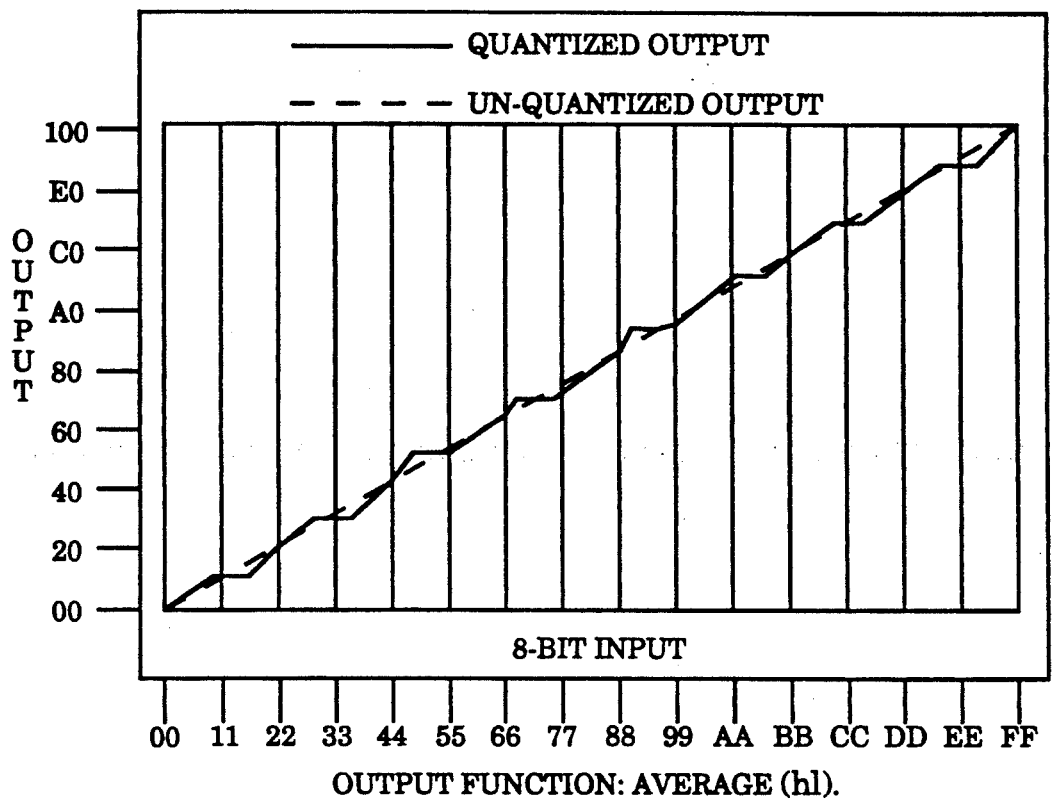
FIGS. 7a and 7b graphically illustrate the output after dithering utilizing the method and apparatus of the present invention and its corresponding error function.
Figure 7B:
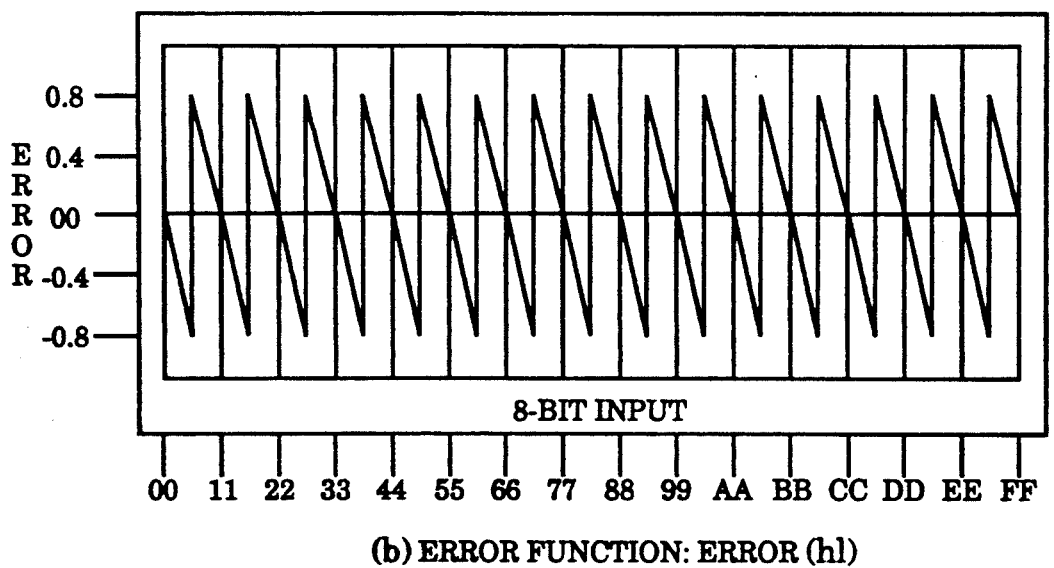

The analytical results are graphically depicted in FIGS. 6a and 6b. FIGS. 7a and 7b both demonstrate how the average output fluctuates about the input value (note that the scale of the figures greatly exaggerates the apparent magnitude of the fluctuations). By equally balancing the positive and negative errors throughout the intensity scale, the dithering process will maintain the image's energy distribution, eliminating biasing. In addition, due to the dispersion of error achieved employing the invention, the deviation at any particular intensity is so small ($\leq \frac{1}{2}$) that it cannot be visually detected.

While the invention has been described in conjunction with the preferred embodiment, it is evident that numerous alternatives, modifications, variations and uses will be apparent to those skilled in the art in light of the foregoing description. In particular, although the invention has been described in detail with respect to an eight-bit to four-bit dithering process, the invention may be utilized in any size dithering process.

I claim:

1. A system for dithering an image comprising a plurality of pixels and displaying said image on a graphics display monitor, said system comprising:
    an input device for inputting image information to said system;
    an input/output circuit coupled to said input device for formatting said image information;
    a graphics display monitor for displaying said image on a two-dimensional display screen, said display monitor coupled to said input/output circuit;
    a memory circuit coupled to said input/output circuit;
    means for generating a first plurality of electrical signals wherein each one of said first plurality of electrical signals corresponds to a separate one of said plurality of pixels and further indicates an input intensity for that separate one of said plurality of pixels;
    means for generating a second plurality of electrical signals wherein each one of said second plurality of electrical signals corresponds to a separate one of said plurality of pixels and further indicates an output quantized intensity value for that separate one of said plurality of pixels;
    means for generating a third plurality of electrical signals wherein each one of said third plurality of electrical signals corresponds to a dither matrix entry and further indicates a dither matrix value;
    means for comparing said first plurality of electrical signals to said second plurality of electrical signals and utilizing the results of said comparisons to generate a fourth plurality of electrical signals, wherein each one of said fourth plurality of electrical signals corresponds to a separate one of said plurality of pixels and further indicates the intensity difference between the output quantized intensity value and the input intensity value for that separate one of said plurality of pixels;
    means for modifying said fourth plurality of electrical signals based upon the range of dither matrix values in said third plurality of electrical signals to generate a fifth plurality of electrical signals;
    means for comparing said third plurality of electrical signals to said fifth plurality of electrical signals, and utilizing the results of said comparisons to generate a sixth plurality of electrical signals, wherein each one of said sixth plurality of electrical signals corresponds to a separate one of said plurality of pixels and further indicates a dithered output intensity for that separate one of said plurality of pixels;
    means for applying said sixth plurality of electrical signals to said graphics display monitor;
    means for actuating said plurality of pixels at specified locations and intensities on said graphics display monitor in accordance with the dithered output intensities indicated by said sixth plurality of electrical signals.

2. An apparatus for dithering a digital image from an input intensity range to an output intensity range of quantized intensity values and displaying said dithered digital image, said digital image comprising a plurality of pixels, each pixel having an input intensity value associated with it from the input intensity range, wherein said digital image is dithered from a q-bit intensity value per color component per pixel, to a p-bit intensity value per color component per pixel, where p is a value less than q, the number of elements in the input intensity range being 2q and the number of elements in the output intensity range being 2P, said apparatus comprising;
    a graphics display monitor comprising a matrix of pixels;
    a frame buffer;
    means for generating a first mapping function between said input range of intensity values and said output range of quantized intensity values;
    means for determining a base value for the input intensity value of each of said plurality of pixels, said base value being an input scale value corresponding to a quantized intensity value which is closest to, but not greater than the input intensity value;
    means for determining an interval between quantized intensity values the input intensity value is within, said interval comprising the values from, and including, the intensity value corresponding to the base value, up to the intensity value corresponding to the base value +1;
    means for determining a distance value, said distance value being the distance between the input intensity value of a pixel and the quantized intensity value which corresponds to the base value;
    a dither matrix comprising a range of dither values;
    means for retrieving a dither value from said dither matrix;
    means for generating a second mapping function between the range of dither values in said dither matrix and the range of values in said interval;
    means for adjusting the distance value according to the second mapping function;
    a comparator for comparing said adjusted distance value and said retrieved dither value;

means for setting the output intensity value based on the comparison of said adjusted distance value and said retrieved dither value, said means setting the output intensity value to be equal to the quantized intensity value corresponding to the base value, in the event said adjusted value is less than, or equal to, said retrieved dither value; and said means setting the output intensity value to be equal to the quantized intensity value corresponding to the base value +1, in the event said adjusted value is greater than said retrieved dither value;

output means for storing in the frame buffer the output intensity value for each pixel in said plurality of pixels at a location corresponding to that pixel;

frame buffer control means for retrieving said plurality of pixels stored in the frame buffer and generating a plurality of electrical signals to actuate said plurality of pixels on said graphics display monitor such that each pixel is actuated at an intensity indicated by the stored output intensity level for that pixel;

whereby said plurality of pixels comprising said digital image are dithered and actuated on said graphics display monitor.

3. The apparatus for dithering a digital image as provided in claim 2, wherein the means for generating a first mapping function comprises:

means for mapping a minimum input intensity value to a minimum quantized intensity value;

means for mapping a maximum input intensity value to a maximum quantized intensity value; and means for mapping the input intensity values between the minimum and maximum input intensity values to the quantized intensity values between the minimum and maximum quantized values.

4. The apparatus for dithering a digital image as provided in in claim 2, wherein the means for generating a second mapping function and means for adjusting the distance value comprise:

means for calculating a proportion of the distance value to the size of the interval; and means for determining the adjusted value from the product of the proportion and the number of values in the dither matrix.

5. An apparatus for dithering a digital image from an input intensity range to an output intensity range of quantized intensity values and displaying said dithered digital image, said digital image comprising a plurality of pixels, each pixel having an input intensity value associated with it from the input intensity range, wherein said digital image is dithered from a q-bit intensity value per color component per pixel, to a p-bit intensity value per color component per pixel, where p is a value less than q, the number of elements in the input intensity range being $2q$ and the number of elements in the output intensity range being $2P$, said apparatus comprising:

a graphics display monitor comprising a matrix of pixels;

a frame buffer;

means for generating a first mapping function between said input range of intensity values and said output range of quantized intensity values;

means for determining a base value for the input intensity value of a pixel, said base value being an input scale value corresponding to a quantized intensity value which is closest to, but not less than the input intensity value;

means for determining an interval between quantized intensity values the input intensity value is within, said interval comprising the values from, and including, the intensity value corresponding to the base value, down to the intensity value corresponding to the base value $-1$;

means for determining a distance value, said distance value being the distance between the input intensity value of the pixel and the quantized intensity value which corresponds to the base value;

a dither matrix comprising a range of dither values;

means for retrieving a dither value from said dither matrix;

means for generating a second mapping function between the range of dither values in said dither matrix and the range of values in said interval;

means for adjusting the distance value according to the second mapping function;

a comparator for comparing said adjusted distance value and said retrieved dither value;

means for setting the output intensity value based upon the comparison of said adjusted distance value and said retrieved dither value, said means setting the output intensity value to be equal to the quantized intensity value corresponding to the base value, in the event said adjusted value is greater than, or equal to, said retrieved dither value, and said means for setting the output intensity value to be equal to the quantized intensity value corresponding to the base value $-1$, in the event said adjusted value is less than said retrieved dither value;

output means for storing in the frame buffer the output intensity value for each pixel in said plurality of pixels at a location corresponding to that pixel;

frame buffer control means for retrieving said plurality of pixels stored in the frame buffer and generating a plurality of electrical signals to actuate said plurality of pixels on said graphics display monitor such that each pixel is actuated at an intensity indicated by the stored output intensity level for that pixel;

whereby said plurality of pixels comprising said digital image are dithered and actuated on said graphics display monitor.

6. A method for dithering and displaying an image on a graphics display monitor, said image comprising a plurality of pixels, said method comprising the steps of:

generating a first plurality of electrical signals wherein each one of said first plurality of electrical signals corresponds to a separate one of said plurality of pixels and further indicates an input intensity for that separate one of said plurality of pixels;

generating a second plurality of electrical signals wherein each one of said second plurality of electrical signals corresponds to a separate one of said plurality of pixels and further indicates an output quantized intensity value for that separate one of said plurality of pixels;

generating a third plurality of electrical signals wherein each one of said third plurality of electrical signals corresponds to a dither matrix entry and further indicates a dither matrix value;

comparing said first plurality of electrical signals to said second plurality of electrical signals and utilizing the results of said comparisons to generate a fourth plurality of electrical signals, wherein each one of said fourth plurality of electrical signals corresponds to a separate one of said plurality of pixels and further indicates the intensity difference between the output quantized intensity value and the input intensity value for that separate one of said plurality of pixels;

modifying said fourth plurality of electrical signals based upon the range of dither matrix values in said third plurality of electrical signals to generate a fifth plurality of electrical signals;

comparing said third plurality of electrical signals to said fifth plurality of electrical signals, and utilizing the results of said comparisons to generate a sixth plurality of electrical signals, wherein each one of said sixth plurality of electrical signals corresponds to a separate one of said plurality of pixels and further indicates a dithered output intensity for that separate one of said plurality of pixels;

applying said sixth plurality of electrical signals to said graphics display monitor;

actuating said plurality of pixels at specified locations and intensities on said graphics display monitor in accordance with the dithered output intensities indicated by said sixth plurality of electrical signals.

7. A method for dithering a digital image from an input intensity range to an output intensity range of quantized intensity values and displaying said dithered digital image, said digital image comprising a plurality of pixels, each pixel having an input intensity value associated with it from the input intensity range, wherein said digital image is dithered from a q-bit intensity value per color component per pixel to a p-bit intensity value per color component per pixel, where p is a value less than q, the number of elements in the input intensity range being 2q, and the number of elements in the output intensity range being 2P, said method comprising the steps of:

generating a first mapping function between said input range of intensity values and said output range of quantized intensity values;

determining a base value for the input intensity value of each of said plurality of pixels, said base value being an input scale value corresponding to the quantized intensity value which is closest to, but not greater than the input intensity value of the pixel;

determining the interval between quantized intensity values the input intensity value is within, said interval comprising the values from, and including, the intensity value corresponding to the base value up to the intensity value corresponding to the base value +1;

determining a distance value, said distance value being the distance between the input intensity value of the pixel and the quantized intensity value which corresponds to the base value;

providing a dither matrix having a range of dither values;

retrieving a dither value from the dither matrix;

generating a second mapping function between the range of dither values in the dither matrix and the range of values in the interval;

adjusting the distance value according to the second mapping function;

comparing with a comparator the adjusted distance value and dither value;

if the adjusted distance value is less than, or equal to, the retrieved dither value, setting the output intensity value to be equal to the quantized intensity value corresponding to the base value;

if the adjusted distance value is greater than the retrieved dither value, setting the output intensity value to be equal to the quantized intensity value corresponding to the base value +1;

storing in a frame buffer the output intensity level for each pixel in said plurality of pixels at a location corresponding to that pixel:

retrieving said plurality of pixels stored in said frame buffer; and generating a plurality of electrical signals to actuate said plurality of pixels on a graphics display monitor such that each pixel is actuated at an intensity indicated by the stored output intensity level for that pixel;

whereby said plurality of pixels comprising said digital image are dithered and actuated on said graphics display monitor.

8. The method of claim 7 wherein the step of generating a first mapping function comprises the steps of:

mapping a minimum input intensity value to a minimum quantized intensity value;

mapping a maximum input intensity value to a maximum quantized intensity value; and mapping the input intensity values between the minimum and maximum input intensity values to the quantized intensity values between the minimum and maximum quantized intensity values.

9. The method of claim 8 wherein the step of mapping the input intensity values between the minimum and maximum input intensity values to the quantized intensity values between the minimum and maximum quantized intensity values, evenly distributes contiguous portions of input intensity values to quantized intensity values wherein the interval spacing between quantized intensity values is uniform.

10. The method of claim 8 wherein the step of mapping the input intensity values between the minimum and maximum input values to the quantized intensity values between the minimum and maximum quantized values, unevenly distributes contiguous portions of input intensity values to quantized intensity values wherein the interval spacing between quantized intensity values is smaller at lower intensity values than at higher intensity values.

11. The method of claim 7 wherein the steps of generating a second mapping function and adjusting the distance value comprise the steps of:

calculating a proportion of the distance value to the size of interval;

determining the adjusted distance value from the product of the proportion and number of values in the dither matrix.

12. The method of claim 7 wherein q equals 8 and p equals 4, the range of input intensity values being 0–255 and the range of output intensity values having 16 elements between 0 and 255, the step of generating a first mapping function generates the following mapping:

| input intensity value | quantized element sequence number | quantized intensity value |
| --- | --- | --- |
| 0–16 | 0 | 0 |
| 17–33 | 1 | 17 |
| 34–50 | 2 | 34 |
| 51–67 | 3 | 51 |
| 68–84 | 4 | 68 |
| 85–101 | 5 | 85 |

-continued

| input intensity value | quantized element sequence number | quantized intensity value |
|---|---|---|
| 102–118 | 6 | 102 |
| 119–135 | 7 | 119 |
| 136–152 | 8 | 136 |
| 153–169 | 9 | 153 |
| 170–186 | 10 | 170 |
| 187–203 | 11 | 187 |
| 204–220 | 12 | 204 |
| 221–237 | 13 | 221 |
| 238–254 | 14 | 238 |
| 255 | 15 | 255 |

13. The method of claim 12 wherein the range of elements in the dither matrix are between 0 and 15 and the step of generating a second mapping function generates the following mapping function of distance values;

| distance value | adjusted distance value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 8 |
| 10 | 9 |
| 11 | 10 |
| 12 | 11 |
| 13 | 12 |
| 14 | 13 |
| 15 | 14 |
| 16 | 15 |

14. A method for dithering a digital image from an input intensity range to an output intensity range of quantized intensity values and displaying said dithered digital image, said digital image comprising a plurality of pixels, each pixel having an input intensity value associated with it from the input intensity range, wherein said digital image is dithered from a q-bit intensity value per color component per pixel to a p-bit intensity value per color component per pixel, where p is a value less than q, the number of elements in the input intensity range being 2q, and the number of elements in the output intensity range being 2P, said method comprising the steps of:

generating a first mapping function between said input range of intensity values and said output range of quantized intensity values;

determining a base value for the input intensity value of each of said plurality of pixels, said base value being an input scale value corresponding to the quantized intensity value which is closest to, but not less than the input intensity value of the pixel;

determining the interval between quantized intensity values the input intensity value is within, said interval comprising the values from, and including, the intensity value corresponding to the base value down to the intensity value corresponding to the base value $-1$;

determining a distance value, said distance value being the distance between the input intensity value of the pixel and the quantized intensity value which corresponds to the base value;

providing a dither matrix having a range of dither values;

retrieving a dither value from the dither matrix;

generating a second mapping function between the range of dither values in the dither matrix and the range of values in the interval;

adjusting the distance value according to the second mapping function;

comparing with a comparator the adjusted distance value and dither value;

if the adjusted distance value is greater than, or equal to, the retrieved dither value, setting the output intensity value to be equal to the quantized intensity value corresponding to the base value;

if the adjusted distance value is less than the retrieved dither value, setting the output intensity value to be equal to the quantized intensity value corresponding to the base value $-1$;

storing in a frame buffer the output intensity level for each pixel in said plurality of pixels at a location corresponding to that pixel;

retrieving said plurality of pixels stored in the frame buffer; and generating a plurality of electrical signals to actuate said plurality of pixels on a graphics display monitor such that each pixel is actuated at an intensity indicated by the stored output intensity level for that pixel;

whereby said plurality of pixels comprising said digital image are dithered and actuated on said graphics display monitor.

* * * * *